United States Patent

[11] 3,582,880

[72] Inventors William F. Beausoleil
Le Cap, Antibes, France;
Richard S. Rohde, Boulder, Colo.; Ronald M. Smith; Henry Zeiger, both of Poughkeepsie, N.Y.

[21] Appl. No. 878,993
[22] Filed Dec. 5, 1969
[45] Patented June 1, 1971
[73] Assignee International Business Machines Corporation
Armonk, N.Y.
Continuation-in-part of application Ser. No. 521,055, Jan. 14, 1966, now abandoned.

[54] DATA ERROR CORRECTION BY INVERSION STORAGE
4 Claims, 3 Drawing Figs.

[52] U.S. Cl. .......... 340/146.1, 235/153
[51] Int. Cl. .......... G06f 11/00, G08c 25/00
[50] Field of Search .......... 340/146.1; 235/153

[56] References Cited

UNITED STATES PATENTS

| | | | |
|---|---|---|---|
| 2,997,540 | 8/1961 | Ertman | 340/146.1X |
| 3,001,017 | 9/1961 | Dirks | 340/146.1X |

*Primary Examiner*—Malcolm A. Morrison
*Assistant Examiner*—Charles E. Atkinson
*Attorney*—Hanifin and Jancin

ABSTRACT: A system for sending and receiving data and detecting data errors for correction which includes means for detecting an error in data as it is read from a tape or like device and means for forwarding the data with the error into a further storage point in the system where it is stored for a first time. A second cycle or storage of the data with the error in the storage point is called for, the data with error being arranged to distinguish it from the arrangement of the error data as it existed at the first time at the storage point. The two versions of the same data having error therein are compared to detect and correct the data in error.

INVENTORS
WILLIAM F. BEAUSOLEIL
RICHARD S. ROHDE
RONALD M. SMITH
HENRY ZEIGER

BY John W. Armbruster
ATTORNEY

DATA ERROR CORRECTION BY INVERSION STORAGE

This is a continuation of application Ser. No. 521,055, filed Jan. 17, 1966, and now abandoned.

This invention relates generally to detection and correction of data transmitted from one device to another and more particularly to a system wherein erroneous data is put into storage twice, the second time in a partly inverted form so that subsequent comparison testing may be effected to determine the location and treatment required for correcting the error independently of the original source which may have been lost or abandoned.

The invention involves a system for propagating detected error information over an established data path that is suited for transmitting only errorless information. In a data processing system involving the transfer of data from an input/output device such as a magnetic tape sensing device and through its control unit and data channel into a central processing unit storage device, the established data paths will transfer only valid data. In other words, the data control unit will generate a parity checking bit for each byte or character of data presented to it from the tape sensing unit and send this parity checking bit along with the data byte or character bytes to the central processing unit storage device. Heretofore, the central processing unit would ordinarily interpret any such parity errors as errors occuring along the data path anywhere between the tape control unit and the CPU storage device or an error in the memory entry difficult to diagnose. Thus, ordinarily the derivation of an error is lost. However, in this present case, there is a more definite pinpointing of error. Heretofore, characters or bytes of data with one or more errors in them are read off the tape record and transmitted to the central processing unit storage as valid errorless data. The source of the error indication, detected initially by vertical redundancy checking of the byte or character on the tape record will have been lost and not propagated along with the transmitted data even though the error was initially identified at the input tape control unit.

The invention involves checking the redundancy of each received byte, discarding the tape redundancy bits, and generating a new redundancy for each byte before transmitting it. As received from the tape, there is information data represented by six of seven positions of a seven-track binary coded decimal representation with a seventh odd parity check bit. This seventh tape check bit is discarded in generating for storage a nine-place code with new redundancy suited to be represented and inverted in a plurality of code positions.

Expressing the foregoing in a more specific fashion, it may be noted that the invention involves means for preserving the error indication for each bad character or byte as it is read from the tape and recoded and this information is sent along into CPU storage for subsequent corrective action. The invention involves use of inverting logic devices in the control unit of the tape input device so that one or more of check bit recode positions can have its sensed bit output inverted upon the detection of an error at the tape sensing control unit. This is done while the portion of the tape in error is being read the second time. On the first pass, the erroneous sensing of tape record is transferred to the CPU storage unit just as it appears when recorded from the tape; on the second pass, the CPU instruction portion instructs the control unit to invert one or more of the bits in the recoded byte or character that is in error and store both in a second location so that there is a complete record with some or all bits of the characters in error inverted or partially inverted. Both of the records of the data in storage will have correct parity associated with each of the characters. Once the erroneous data is in the CPU storage device in a dual form, it is no longer dependent on the original source and immediately or at some later convenient time, the central processing unit can identify the bad bits or characters by means of, for example, a comparing operation of the two sets of related data in storage. Those characters found not to compare as equal are in error and then the CPU is equipped to take subsequent corrective action. It is evident that the technique is designed for multiple errors as well as single bit corrections.

From the foregoing, it is apparent that the idea of the invention is to pinpoint any error at the source and carry such a fine definition or location of error along to where it is stored and no longer confused with internal error, and then compensation may be performed without widespread data repetition or loss, or need to refer to the original source. The steps in operation of the system may be noted by pointing out that initially there is detection of lack of character parity by a vertical redundancy check. Then this is sent as a detection to the CPU which then allows the storage of the first pass of the data in the CPU storage unit and along with this there is a CPU instruction that there should be a second pass. When a second pass is made, this is done with inversion of one or more of the check bit lines of the derived conversion code of the data sensed on the tape, and the second pass is made with a separate location or address of storage of the data sensed and inverted in the storage unit and, after these two stores have been made, comparison of such two stores may be made at any time to detect the bad bits or bytes or portions of the character record in storage. Thus, there is provided means to propagate detected error information over the normal channel paths without invalidating the path or adding bit positions to the tape track paths in order to recover original data information that could not normally be recovered.

Therefore, it is an object of this invention to provide means for detecting and preserving erroneous recorded data within the bounds of existing equipment, so that correction of data may be effected at a propitious time.

It is another object of this invention to provide simple and economic means for detecting preserving and correcting errors which are initially detected but stored to be processed at a later time when the data is required independently of the original source.

Another object of the invention is to provide a system using inversion logic in connection with data transmission whereby error detections may be singled out, propagated and passed along to a point of convenient comparison correction.

Another object of the invention is to provide means of recovering records on tape systems or other input/output devices that would normally be considered beyond recovery. The reliability of data processing systems is enhanced by providing logical components which, when activated by error, cause an assigned bit position or positions to be inverted on any character that has been detected as invalid at the input source device.

Another object of the invention is to provide programming means for activating an inverting logic control and a record rereading control to invert selected check bits of an input character byte or an entire character byte of assigned track or tracks of recording control media.

Another object of the invention is to provide an error checking storage system whereby an error correcting operation may be performed immediately or suspended when once invalid or defective source information is stored in a dual fashion. The original source record may be lost or destroyed and yet the information is preserved in a form suitable to be corrected and used in a most novel and useful fashion.

Another object of the invention is to provide means for checking the reliability of transmitted information in a minimum of time. Since the erroneous transmitted data is stored, there is the chance afforded of recording subsequent information while previously recorded information is simultaneously being checked, reproduced and transmitted.

The foregoing and other objects, features and advantages of the invention will be apparent from the following more particular description of a preferred embodiment of the invention, as illustrated in the accompanying drawings.

To summarize the present invention, it may be noted that it is illustrated in connection with a system for programming a computer having an interface which does not permit transmittal of bad parity information. It involves the detection of error in data in a transmission channel or tape track with the error information not available in the sense byte but that the inversion of a bit in the erroneous parity byte may be effective not in any identified track in error but it is denoted an arbitrarily designated track for an inversion or the same may be done in a plurality of tracks. In the system after the detection of an error the program can return after an interruption to the tape drive having the error and cause a rereading of it with the indicated inversion of a predetermined bit position in the defective parity byte or bytes which record is stored in a different area of memory than that which was allocated to storage during the first reading of the record. Subsequently, a byte by byte comparison may be effected between the two related records in storage and then any noncomparing bytes serve to locate an erroneous byte in the storage record. As a simple way of effecting correction, the program may print out only the part of the stored record adjacent to the erroneous byte so that it may be corrected manually. However, it is apparent that a more sophisticated system may be provided through controls of the central processing unit to effect correction automatically and immediately.

It is contemplated that the subject type of error detection may be utilized in a broader sense in data communication channels independently of any computer or programming control and merely involve storage and inversion of erroneous data.

Figure 1:
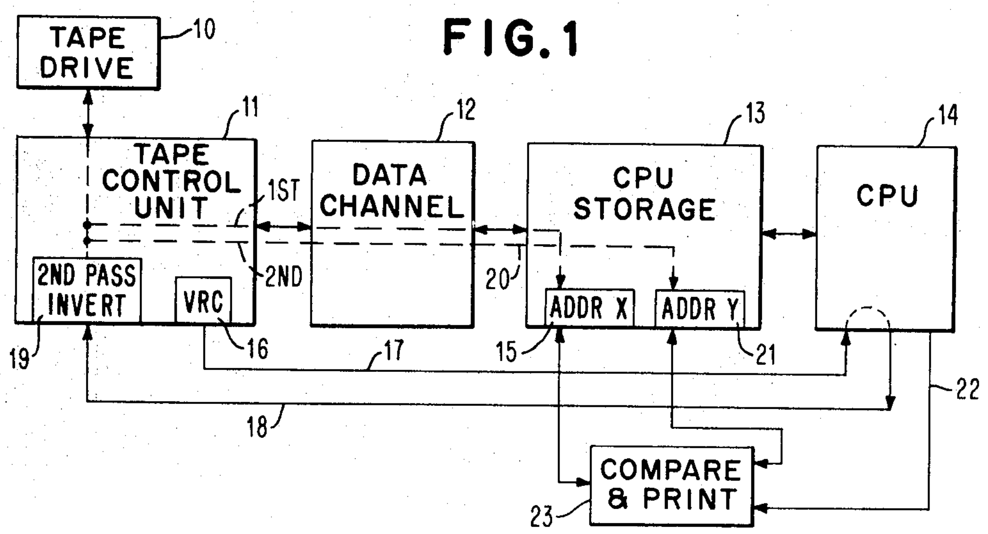
FIG. 1 is a functional block diagram illustrating how defective data is stored a second time in a CPU storage control system.

The arrangement shown in FIG. 1 substantially finds basis in the publication entitled "IBM/360 I/O Interface Channel to Control Unit," File No. S/360-19, Form A22-6843-3, IBM Systems Reference Library.

In FIG. 1 it is noted that there is a left to right arrangement of device-representing blocks showing the path of data information from an input unit, such as the tape sensing drive device 10, over into a central processing unit storage device 13 for a data processing system. In this path the seven-bit tape code is changed to a nine-bit storage code. The complete path of control includes the magnetic tape sensing unit 10 followed by a tape control unit 11 and then through a data channel selection device 12 and from there into the central processing unit storage unit 13 which in turn is controlled in a programmable fashion by the CPU unit 14 wherefrom instructions are sent back and forth to the other various units. In the foregoing described path, as described in the above set forth publication, there actually is also provided an I/O interface. This interface consists of signal lines that connect a number of control units to a channel.

As shown diagrammatically in FIG. 1, when there is a reading taken from the magnetic tape by unit 10, another unit 16 performs a vertical redundancy check on such read information, and this unit 16 is associated with the tape control unit 11. Such vertical redundancy check is described on page 8 of the publication entitled "IBM 2401, 2402, 2403, 2404, and 2416 Model 1 Principles of Operation," June 1965, File No. S360-05, Form A22-6866-1 of the IBM Systems Reference Library. The results of the vertical redundancy check are passed as sense data over the I/O interface between tape control unit 11 and data channel 12, and from there to CPU Storage 13 through data channel 12. Ordinarily there is no error found and the sensed data is directed directly through the channel unit 12 and into the storage device 13 as represented by the address X-block 15 in storage. In the present devices, this same initial storage arrangement is carried out even in the presence of a detected error and the first ordinary reading is a first tape scan and is one of several other steps performed with the realization that error is present.

Assuming that the vertical redundancy check device 16 finds an error in parity in a sensed byte or character, then the error detection signal is sent along path 17 to the CPU device 14 which in turn sends back instruction along line 18 to call for a second pass of the same portion of the tape found in error and also calls for inversion of a predetermined part of such a second pass data when sent to storage. Although shown diagrammatically as providing separate control paths 17 and 18 for the CPU controls it will be understood that this kind of control is more usually found in the storage unit 13 by diagnostic procedures set up by programming through the CPU to test every stored entry for true parity conditions. However, in any event, the CPU unit 14 becomes aware that an error exists in the data stored initially at address X and sets up the routine calling for a rescan of the same tape information with the expanded nine-bit code allowing for extra check bit positions wherein inversion may be made and provision made for separate storage of said secondary consideration at an address Y in the storage unit 13. When the information data is so stored in the two positions 15 and 21 in the storage unit 13, then the system may continue on without separate interruptions for isolated error character considerations and instead such diagnosis may be postponed until it is at a more propitious time to be considered.

For such subsequent consideration and correction of what is originally stored in a dual formation there is provided a compare and printout unit 23 which is arranged to compare predetermined portions of the stored data in address X and address Y to detect the error which is known to exist at such places. In order to call for the operation of such a compare device 23 at the proper time, there is an instruction or command connection 22 from the CPU unit 14 to the compare device 23.

At this point of the description it is well to go into further detail regarding the appearance of the information and check bit data as it is represented at the source such as on a magnetic tape, and as it is found when an error is derived therefrom, and also as it is found when put into storage as coded in an expanded form.

Figure 3:
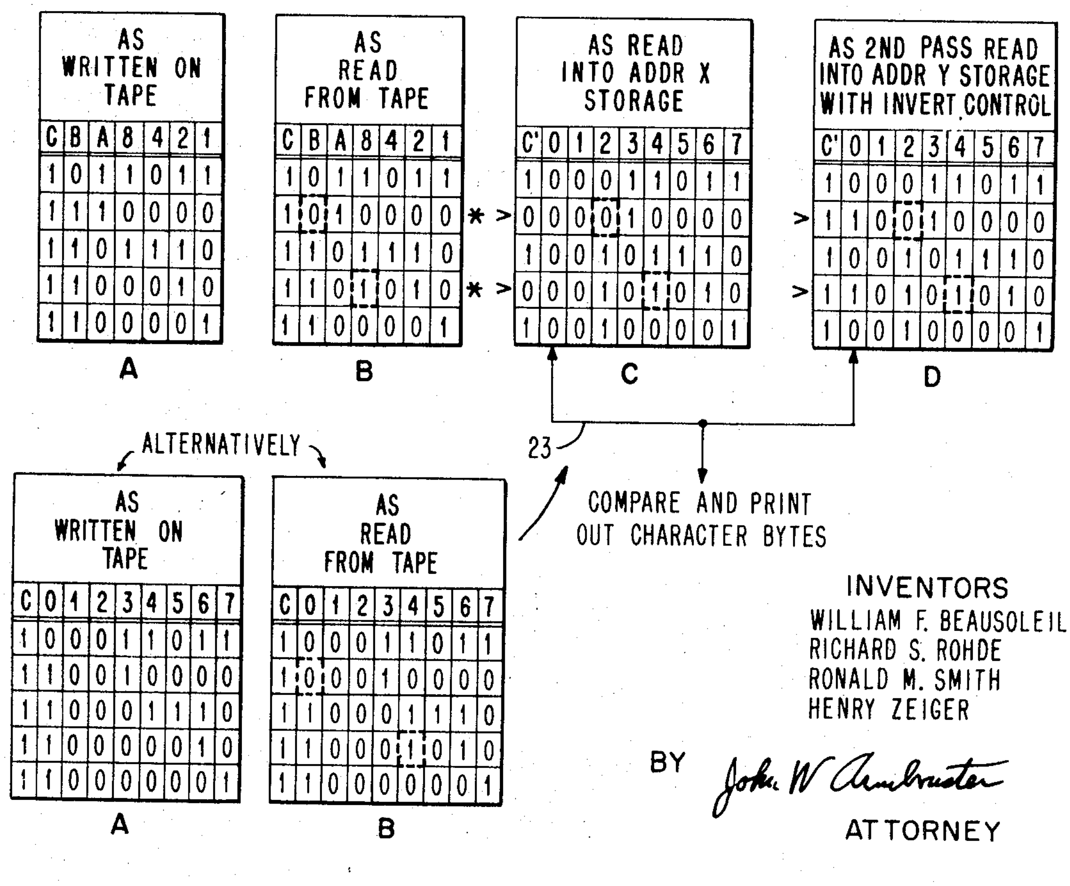
FIG. 3 shows a series of examples of correct and erroneous bits as they are written on and read off the tape and directed into storage in readiness for comparison for correction.

Referring to FIG. 3, at the left, in grouping A, is shown a series of code designations in a binary coded decimal form comprising either seven or nine places wherein the information bits are represented by columns B, A, 8, 4, 2, 1 or alternatively, 0, 1, 2, 3, 4, 5, 6, 7, and there is also the seventh or ninth bit C column at the left wherein a one bit indicates an odd condition of parity which is normal. When such information as represented at group A in FIG. 3 is read off a tape, an error is caused by the dropping out of a bit or the picking up an erroneous bit, then the appearance of a read record may be found as shown in the second grouping B of FIG. 3. There the second and fourth rows are shown to provide imperfections in that one bit is changed in each of the rows as shown by a dotted outline. The system is suited for detection of any odd number of errors without the use of extra apparatus. There it is also apparent that the odd parity condition no longer prevails and therefore an error is detectable by vertical redundancy checking devices and the C bit is inverted to C′.

Figure 2:
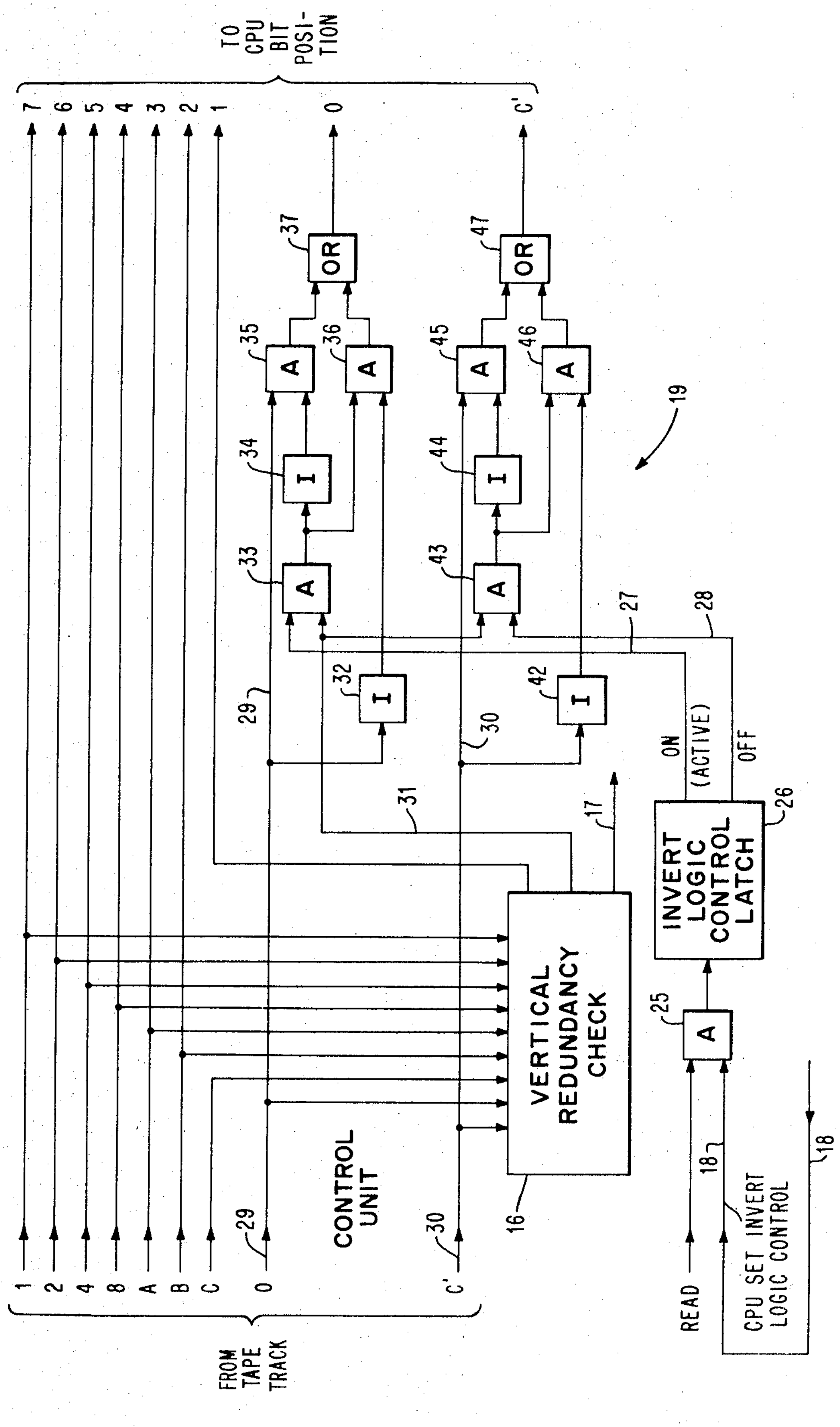
FIG. 2 shows both the inverting logic blocks and the schematic redundancy check circuit of the tape reader.

Such errors are found by the vertical redundancy check device 16 shown in FIG. 1. In FIG. 2 is shown the method of connection and wiring wherein such a unit 16 is placed in a controlling position between the sensing devices of the tape and the recoding and inverting logic control devices for changing the checking code positions and expanding the code from the seven place binary coded decimal system to a nine place system, or merely revising an original nine-place tape reading.

In FIG. 3, the groupings B and C illustrate the change in code between the seven- or nine-place arrangement as read from the tape, and the converted nine-place system as read into the CPU storage device.

FIG. 2 shows how the redundancy check device 16 and the invert logic devices 19 cooperate to check the redundancy of each received byte, and discard the single tape redundancy check bits of column C and generate a new redundancy in a plurality of places for each byte before retransmitting it into the CPU storage sections of the system. Comparing groupings B and C of FIG. 3, it is noted that the six right-hand columns of data bit representations, i.e., the information bits are preserved as they are read from the tape and read in a similar fashion into storage such as the address X at 15, however, the seventh column seen in grouping B, i.e., the check bit position, becomes C′ in the arrangement of storage grouping C, and there it is subject to change along with the other excess positions in the 0 and 1 columns. As read from the tape, there is sensed a seven track binary coded decimal code with a parity check bit. This seventh check bit is discarded between groupings B and C and there is generated a nine-place code with new redundancy suited to take into consideration the detection of errors and also the representations of more than one column for checking to be suited there for inversion in one or more of the several code places. As shown, the inversion is arranged to take place in the two left positions, i.e., the C′ and 0 columns of the storage data as shown in groupings C and D of FIG. 3. By comparing groupings C and D, it is noted that the inversion takes place only in rows 2 and 4 which were noted hereinbefore as the ones presenting errors in reading from the tape.

Although an example is shown presenting a single bit error in each of the rows, it is contemplated that the system disclosed should be specially suited for the detection and correction of multiple errors without the use of extra apparatus. This facet of the system will be more apparent as the description continues.

Now considering in a more detailed fashion the manner of recoding and inverting data in passing between the tape and storage units, reference may be directed to FIG. 2 and first consideration given to the regular transmission of data without correction being required. Assuming that the first row of the data presentation as shown in the FIG. 3 grouping portions A, B, C, D are to be considered; there the transmission is rather straightforward and merely a matter of changing the code from a seven-place system to one of nine places and preserving the odd parity check bit much the same as it appears in grouping A i.e., as it is found on the tape.

At the top of FIG. 2 it is seen that the top six horizontal paths or lines from the left to right represent the direction of sensed data at the left comprising information bits transmitted with their errors over to the right, whereat they are directed into the storage bit positions 2—7, respectively. However, the other three stored positions 1, 0 and C′ at the right in FIG. 2 are derived by recoding and inverting subject to the controls of the units 16 and 19 for redundancy checking, and inversion when required. When an errorless check is found by device 16, then there is no further control provided through 17, 18 and the inversion controls 19. Instead the "off" invert logic line 28 is used to preserve the straightforward direction of the ordinary odd parity check bit representation in the nine-place code directed through the path C′ and line 30 into the AND device 45 where it is accompanied by the indication of normalcy via line 28, AND device 43, inverter 44 and the summating AND device 45 which is directed into the OR device 47 and out to the C′ line directed into the CPU storage unit 13. In a similar fashion the path for the 0 code position condition is represented by an entry over the line 29 of FIG. 2 and is preserved for normal 0 representing control over a set of inversion controls 33, 34, 35, and 37 similar to those pointed out with respect to the parity check bit line C′.

The output line 0, at the left FIG. 2, is subject to inversion as is the C′ line, and it is this 0 line which is here selected for illustration as the inverted key of the second entry at address Y of the CPU storage unit 13 which is later compared with the 0 line of address X to eventually single out for correction those stored information places found to be an error. This is shown diagrammatically in connection with groupings C and D in FIG. 3 where the "compare and print out character byte" diagram 23 is shown to have sensing arrows aligned with the 0 columns of groupings C and D and there they detect differences between C and D in the second and fourth row positions which are the ones previously determined as having erroneous entries from the tape. In the C′ and 0 rows of grouping C it is seen that the check bits of the second and fourth rows are in a 0 condition and, after inversion, the same positions as shown in grouping D are presented as 1 bits, having been inverted by the devices which are about to be explained further in connection with FIG. 2.

Assuming that either of the second or fourth rows of error bearing information shown in FIG. 3 are about to be put into the devices shown in FIG. 2, then it is clear that the information bits in the six upper tracks (FIG. 2) are transmitted directly from tape reading and through several units and into storage as noted before. However, errors in such code places are detected through the corresponding vertical lines of FIG. 2 shown being directed into the vertical redundancy check device 16. When there is a lack of odd parity, showing the presence of error in any of the seven positions, then this device 16 becomes effective to activate the various changes as directed by lines 17 and 18 and the change for inversion by the devices 19. The inversion is effected by the activation called for by directions from the CPU as directed over the illustrative line 18 and combined with the "READ" timing control in the AND device 25. This serves to activate the INVERT logic control latch 26 to put "ON" the active line 27 which is effective to change the settings several of the logic controls 19. It was noted hereinbefore that when there is a lack of parity as present in the second row of grouping C of FIG. 3 then the first entry into storage finds the check bit code position C′ causing the direct entry of a 0 into the corresponding storage position. Now it is desired that upon the second entry of the same information that there be an inversion of the second check bit in column 0. This is performed by having the expanded code position C′ represented by diverted line 30 to pass through to the AND circuit device 45 to be effective. This is caused by the activation of line 27 and the dropping out of line 28 whereby the upper AND device 45 becomes effective and the lower inverting AND device 46 becomes ineffective so that the control from line 30 is directed through the OR device 47 in a fashion to represent a 1 bit on the line C′ when passing through the OR device 47.

In a similar fashion, the recording at the 0 track position through line 29 is inverted to represent a 1 at the error position which in address X was represented as a 0. This is done through the inverting device 32, AND device 36 and OR device 37 leading to the output for the 0 code position of the expanded nine-code positions. In this expanded code, as shown at the right in FIG. 2, the track or position 1 is not used in the inversion checking system as shown but it is apparent that this extra position could also be inverted or used in any fashion as described in connection with the 0 and C′ track positions.

As shown in FIG. 3, for forming a basis of comparison, a mode of operation is assumed and illustrated as though all information calls for a second pass of the tape for reading address Y as well as address X. However, it is apparent that such dual storage representation may be confined to only such data as causes control for a rescanning of the tape. However, in accordance with either system, when the CPU 14 calls for correction as in FIG. 1, which may be desired at any particular time, preferably at the end of a running of a block of information, then the call goes out over path 22 for the comparing and printing unit 23 to become effective for scanning as shown in FIG. 3 to detect the inverted bits of rows 2 and 4 as distinguished from the other rows which afford no check bit inversion differences, or detection of a "1" in an otherwise blank succession of comparisons.

At the end of a tape run or some other convenient time, the CPU unit 14 FIG. 1, may be set up with a programming routine to call for operation of the compare and print control unit 23 to print out those items of information found in storage locations 15 and 21 and found to have disagreeing check bits in the 0 column as pointed out with reference to FIG. 3, and such printed output then becomes available for the operators inspection to bring about correction. Taking as an example the alphabetic recording of names of people on reservation lists it may be assumed that the printout results in a name Philik-Abkerman by inspecting this printout it becomes obvious to the operator that the proper name which should be recorded in records thereafter is the name Philip Ackerman.

From the foregoing, it is apparent that the invention is concerned with means free of interruption and free of requirement of extra tape track provisions or extra code space requirements and instead has means for propagating detected error information over established data paths which would ordinarily only transmit errorless information. Ordinarily the tape sensing controls would generate a parity bit for each byte or character of data presented to it from the magnetic tape and send this parity bit along with the information data into the CPU storage wherein it is interpreted as errors occuring anywhere in the data path. Therefore, in the past, the error source indication associated with the byte or character on the tape record will have been lost and not propagated along with the data even though the error was identified at the outset. Now it is apparent by reference to the means of FIG. 2, and the provision of the vertical redundancy check devices therein, that the error is not only detected at the outset but propagated along even into the storage unit. Thus, there is the means here provided for preserving the error indication for each bad character or byte as it is read from the tape and sent along to the CPU storage unit for subsequent action. The invert logic devices provide the means also whereby an indication of error placement is carried along and made evident in storage so that since the record is read there twice there is a basis of comparison in the CPU storage unit so that at some convenient time, the controls of the system can identify the bad characters by means of a comparison operation of the two preserved storage records.

It is believed well to point out wherein the present system differs in several respects from the various systems of the prior art. As one point of distinction may be noted that inversion is caused before proceeding to operate further and such inversion of check data is sent out into a different address storage area than that provided for an ordinary entry. A second point of distinction is that inversion of a second read out may be induced anywhere along the multiple bits of the second read out and may take in more than one track or all tracks if such a mode is desired. A third point of distinction lies in the fact that there is no requirement of provision of an entire sense byte in storage to serve to locate and indicate an error in information. A fourth point of difference lies in that the present system does not require erasure of any reading put into storage and instead preserves first and second readings of the same information. A fifth point of distinction over some operations is that the present system does not require a shift to another tape drive when an error is detected. A sixth point of distinction lies in the recoding of the information along with inversion which is partial or whole inversion of data code expansion. A seventh difference is that inversion is affected prior to read out i.e., inversion herein is not for direct correction, but is provided as a passing expedient merely for subsequent detection and not for immediate interruption and correction of detected errors.

It is believed appropriate to again point out that the style of operation shown in groupings C and D of FIG. 3 are not necessarily the only mode of operation, that is the invariable repetition of each byte storage operation. Instead the style of operation may include normally only the repetition of data bytes found in error.

In order to recapitulate, it may be noted the invention provides the means to propagate detected error information over normal channel paths without invalidating the path, nor adding bit positions to the path in order to recover original data that normally could not be recovered. To recover this record, the program activates the invert logic and rereads the record. The invert logic serves to invert the bit of the assigned track e.g., track 0, see FIG. 2, of all bytes or characters that are detected by the tape control unit to be invalid through the vertical redundancy check. In storage, the record read on the original reading i.e., the first pass, is compared byte for byte with the record read on the second pass when the invert logic was activated. The bytes that indicate the noncompare situation are identified as the invalid characters. Such invalid characters are then available for further analysis by the program of the system or by the operator. It is notable that the error analysis need not be performed immediately. The original tape record may be destroyed as the two storage records now contain this original tape information which when brought out of storage can be transmitted to another tape or other recording mediums and preserved until the optimum time for reconstructing the initial record.

Although shown and illustrated in connection with conversion from a seven-track tape to a nine-track code, it is apparent that the reverse may be true, or that any other recoding schemes of different compressed or expanded code arrangements may be employed. An advantage lies in that more than single track errors are readily located and corrected and the system readily identifies double and triple errors which are ordinarily found difficult to detect and correct.

The principles of this invention are not restricted to use with tape input devices and computer storage since the principles could be employed on communication type devices in general in connection with other varieties of input and output devices. It is also apparent that a reverse style of operation could be employed wherein storage is the controlling factor for determining recording twice in different portions of one tape or upon different magnetic tapes. For example with data in storage with parity checks such data could be sent out to one or more tapes twice, once with the invert logic activated and at another time without such activation. Then such dual recording tapes could be processed for error identification in a multiprogram environment or preserved on such tapes for a later time or transmitted to another system for processing. As another style of operation, the invention need not be implemented at one end or the other of a communication system, but the invention could be implemented at any of several points along a communication path and there not only could the invalid character be identified but the elements producing the error also identified by the combination of the redundancy check and invert logic controls shown in this invention.

The invention is not restricted to a single track inversion style of operation. Multiple or all tracks as well as a selected track could be inverted as long as the system is organized to be aware of how the character was altered and that the record has not lost its original information content.

An example of a data transmission device is illustrated in a copending application of common assignee, Ser. No. 181,027 filed on Mar. 20, 1962, and now U.S. Pat. No. 3,189,872 issued June 15, 1965, entitled "Data Handling Mechanism." A form of logic control circuitry is shown in IBM U.S. Pat. No. 2,850,647, issued Sept. 2, 1958.

While the invention has been particularly shown and described with reference to a preferred embodiment, it will be understood by those skilled in the art that various changes in form and detail may be made therein without departing from the spirit and scope of the invention.

What I claim is:

1. A data error detection arrangement adapted to be employed in a data processing system which includes a computer having storage means associated therewith, and means for transmitting data presented to said system to said storage means to store said data, said arrangement being adapted to receive commands from said computer, said arrangement comprising:

means for examining said presented data for correctness during said transmitting, said correctness being in accordance with a selected parity criterion to detect data with error, i.e., data not meeting said criterion, said detected data with error also being transmitted to said storage means to be stored in a first location therein; and means responsive to the detection of said data with error for causing said computer to command said arrangement to read and modify said data with error to cause it to meet said criterion and to retransmit said modified data to a second point in said storage means, said modifying being the inverting of a selected portion of said data with error which is less than the total of said data, said data having said selected inverted portion being said modified data transmitted to said second location in said storage means, whereby said originally detected data with error and said last-named data, modified to meet said criterion, are available for comparison.

2. An arrangement as defined in claim 1 and further including means for causing data, presented to said system in a first code form, to be stored in said storage means in a second code form.

3. An arrangement as defined in claim 2 wherein said means for examining said presented data includes means for performing a vertical redundancy check on said presented data to ascertain whether it meets said selected criterion.

4. An arrangement as defined in claim 3 wherein said first code form comprises a predetermined number of binary bits and said second code form is a number of binary bits greater than said predetermined number, said data being stored in said storage means in said second code form.